Patented Apr. 8, 1941

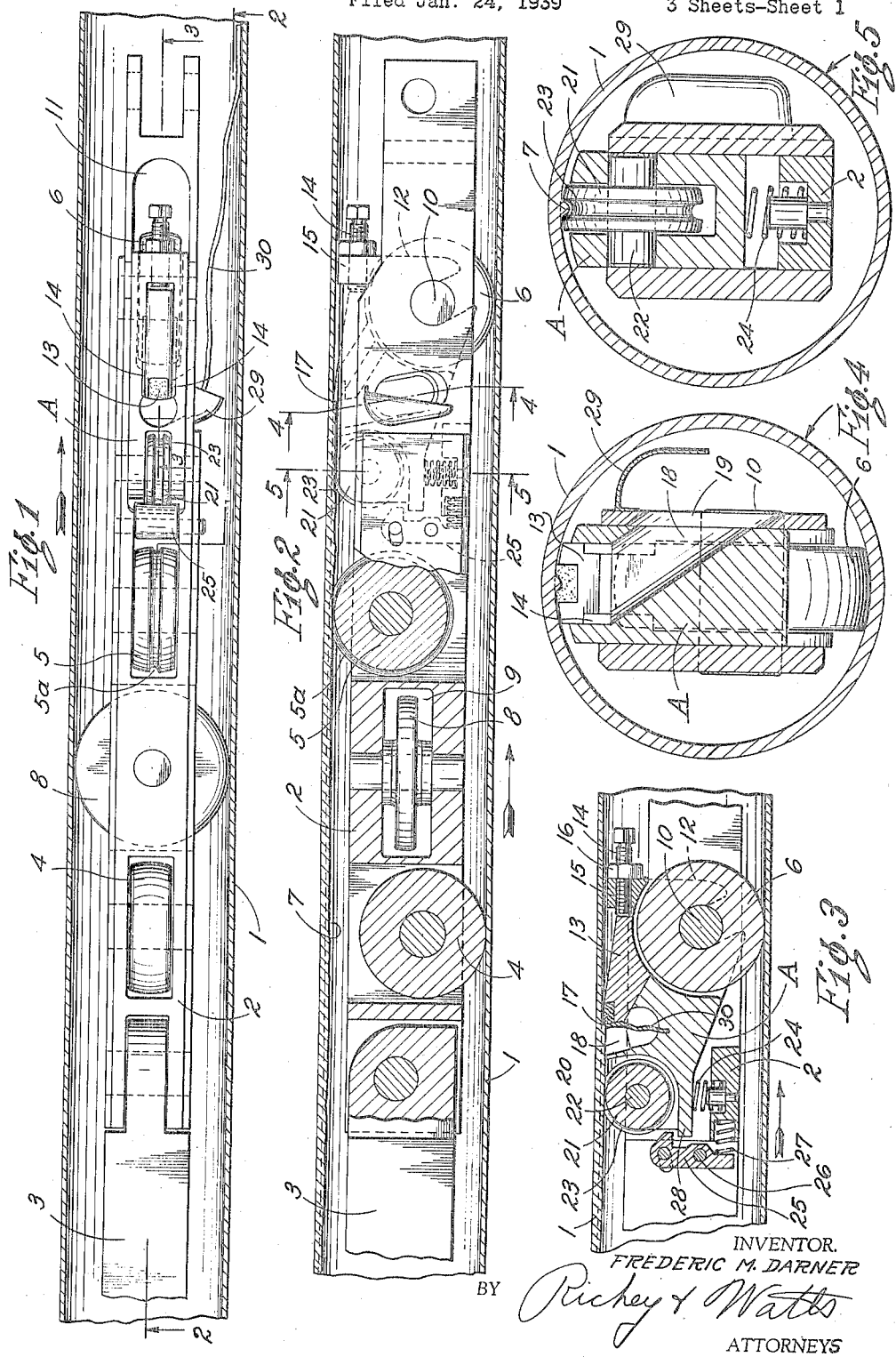

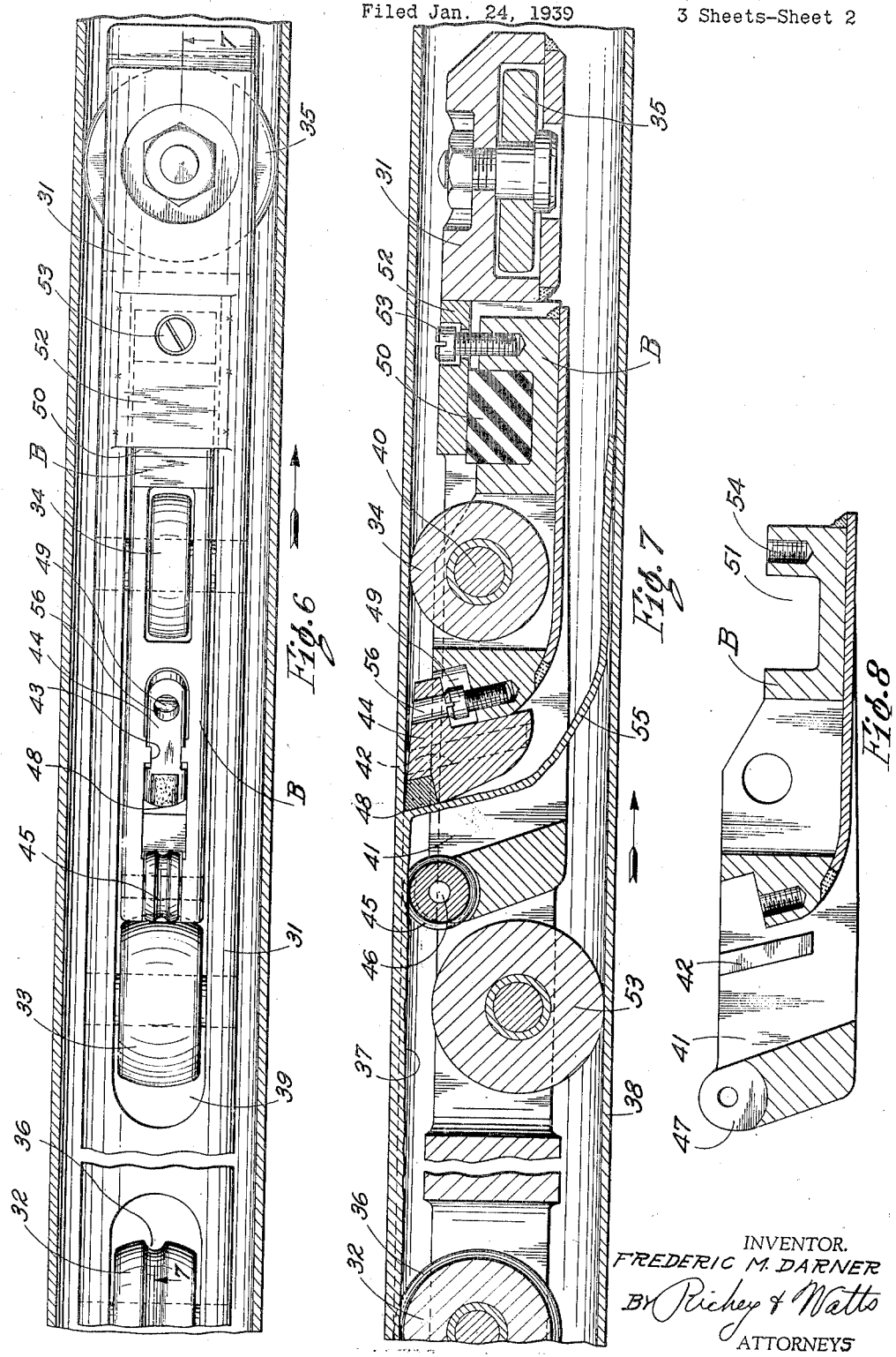

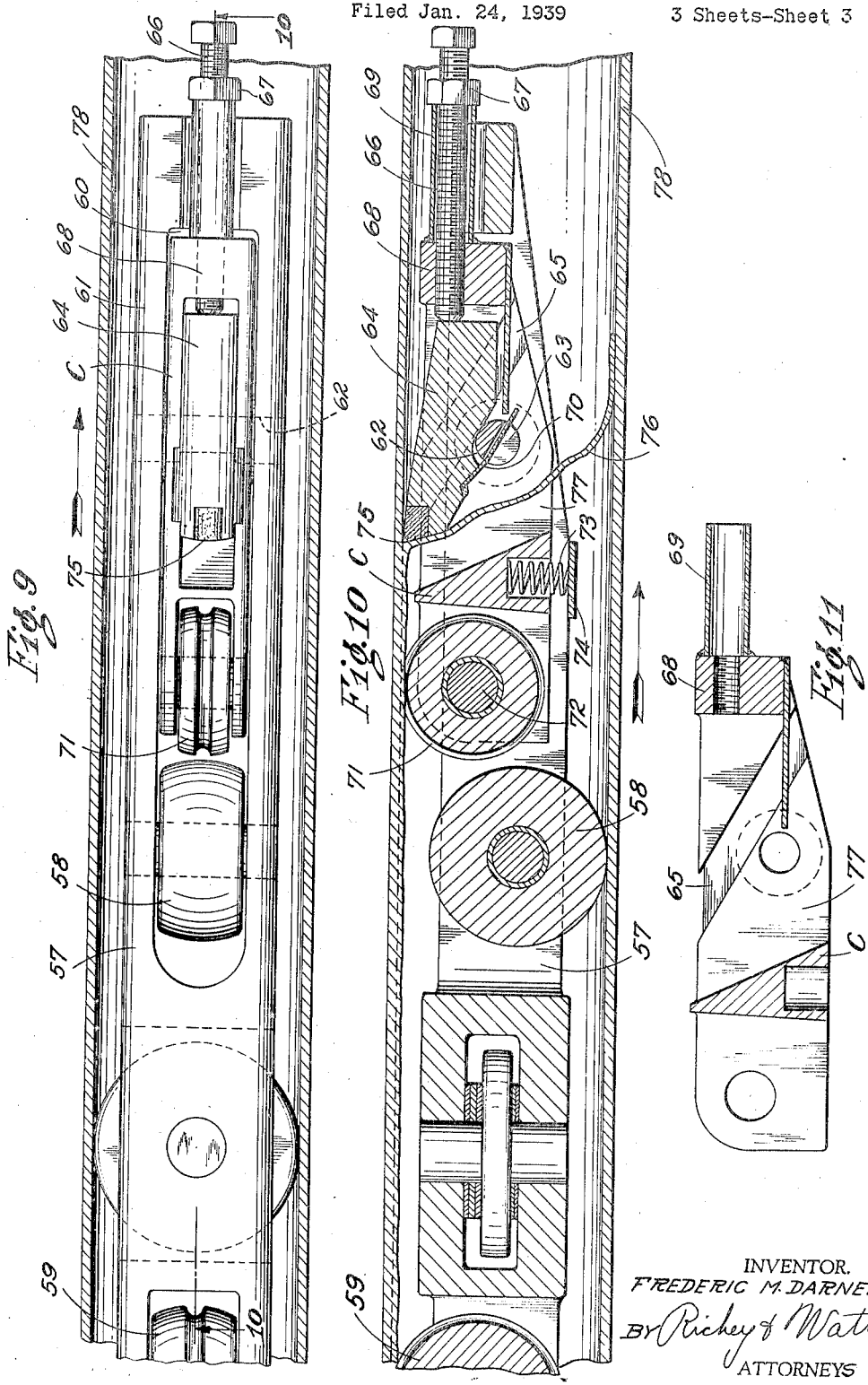

2,237,550

UNITED STATES PATENT OFFICE 2,237,550

INSIDE FLASH CUTTER

Frederic M. Darner, Shaker Heights, Ohio, assignor, by mesne assignments, to Republic Steel Corporation, Cleveland, Ohio, a corporation of New Jersey Application January 24, 1939, Serial No. 252,631

11 Claims. (Cl. 90—24)

This invention relates to the manufacture of welded pipe or tube and more particularly to an improved device for cutting off the welding burr which is extruded on the inner surface of the pipe during the welding operation.

In the butt welding of tubing, particularly by the electric welding processes, a burr or flash is formed on the inner wall of the tube. Various means have been proposed for removing this burr or flash in order to give a relatively smooth inside surface. The Herbert C. Rippel Reissue Patent No. 20,439 of July 6, 1937, discloses an inside burr remover adapted to be supported within the tube or pipe closely adjacent the weld point and adapted to sever the hot flash metal from the inner surface of the weld. The present invention relates to certain improvements in the general type of apparatus disclosed in the above noted Rippel patent, and it is among the objects of the present invention to provide an inside flash cutter or burr remover in which the cutting tool will be caused to engage the tube weld with sufficient force to assure a positive cutting of the burr and will automatically be maintained in position to leave a uniform wall thickness regardless of the variations in the form of the burr or tube wall. Other objects of my invention are the provision of an improved inside burr cutter which is rigidly supported within the tube and which will not chatter or jump away from the tube wall with a resulting rough cut; the provision of a simple, rugged and readily adjustable inside burr cutter in which the severed flash or burr is effectively guided away from the severing device so that danger of marring the inner surface of the tube due to the flash becoming entangled with the cutter frame support rolls or the like is eliminated.

The above and other objects of my invention will appear from the following description of several embodiments thereof, reference being had to the accompanying drawings, in which—

Figure 1 is a plan view of a preferred form of my inside burr remover, shown in position in a tube, the tube being shown in section.

Figure 2 is a view taken on line 2—2 of Figure 1, part of the flash cutter being shown in section and part in view.

Figure 3 is a vertical cross-sectional view taken on line 3—3 of Figure 1.

Figure 4 is an enlarged cross-sectional view taken on line 4—4 of Figure 2.

Figure 5 is an enlarged cross-sectional view taken on line 5—5 of Figure 2.

Figure 6 is a plan view of a modified form of my invention.

Figure 7 is a vertical cross-sectional view taken on line 7—7 of Figure 6.

Figure 8 is a detached view of the pivoted tool carrier of the device shown in Figures 6 and 7.

Figure 9 is a plan view, generally similar to Figures 1 and 6, but illustrating another modification of my apparatus.

Figure 10 is a cross-sectional view taken on line 10—10 of Figure 9.

Figure 11 is a detached cross-sectional view of the tool carrier of the device shown in Figures 9 and 10.

In the drawings, referring particularly to Figures 1 to 5, the tube 1 may be considered to be moving in the direction indicated by the arrow. The flash cutter supporting frame 2 is pivotally attached to an anchor rod 3 which extends through the tube to a point ahead of the welding section where it may be anchored in well known manner. The frame 2 has slots formed therein to accommodate supporting rolls 4, 5 and 6. These rolls all have horizontal axes and, as will be seen from Figure 2, provide a triangular support for the frame 2 as the two rolls 4 and 6 engage the bottom of the tube 1 and the top roll 5 engages the top of the tube 1 diametrically opposite from the rolls 4 and 6. The roll 5 is preferably grooved at 5ª so that its effective surface will engage the wall of the tube and the burr or flash 7 will pass freely therethrough. The guide roller 8 is mounted on a vertical axis in a horizontal slot 9 in the frame 2 and serves to prevent undesired lateral movement of the frame 2 and parts carried thereby.

The last support roll 6 is carried on a shaft 10 and an elongated slot 11 is formed in the frame 2 to accommodate the tool carrier A. This tool carrier A has spaced flanges 12 which fit over the roller 6 and have bearings on the shaft 10 on opposite sides of roll 6. The cutting tool 13 is formed with side flanges 14 which fit within corresponding slots in the sides of the tool carrier A. Sliding adjusting movement may be imparted to the tool 13 by means of the screw 14 which has threaded engagement in an upwardly extending lug 15 which extends across and connects the tops of the flanges 12. A lock nut 16 serves to maintain the screw 14 in any desired adjusted position. The cutting edge 17 of the tool 13 is disposed above a downwardly extending aperture 18 in the tool carrier A which aperture, as is clearly seen in Figure 4, opens out through a corresponding aperture 19 in the side of the supporting frame 2. The forward wall 20 of the top of the aperture 18 separates the gauge roll 21 from the flash passage 19. This gauge roll 21 is mounted upon a shaft 22 in a suitable slot in the tool carrier A and is grooved at 23 to fit over the burr 7.

The cutting edge 17 of the tool 13 is so formed that, when the tube 1 moves relative to the tool 17, the tool will tend to dig into the tube wall. This tendency will cause the tool carrier A to swing about its pivotal support on the shaft 10 but such swinging movement will be restricted and limited by the engagement of the gauge roll 21 with the inner surface of the tube. Due to the angular arrangement of the side flanges 14 of the tool 13, movement of the screw 14 provides a fine and accurate adjustment of the position of the cutting edge of the tool relative to the outer surface of the gauge roll 21 and, with any given adjustment of the tool 13, a cut will be taken from the inner surface of the tube which will be of uniform depth regardless of variations in the size of the burr or flash 7. The depth of cut may, of course, be controlled by the adjusting screw 14.

A spring 24 is supported on the frame 2 and tends at all times to lift the gauge roll 21 and tool 17 into engagement with the inner surface of the tube. However, as soon as the cutting action starts, and the tube is moving in the direction indicated, the force necessary to hold the tool in proper cutting position and to hold the gauge roll 21 firmly against the wall of the tube is provided by the tendency of the tool 17 to dig into the tube wall and lift the tool carrier A. This action is the same in all of the illustrated embodiments of my invention.

A latch member 25 is pivoted in the frame 2 at 26. The spring 27 normally holds the latch in engagement with the projecting lug 28 of the tool carrier A so that, when the flash cutter is removed from the tube, the carrier A will be retained in working position and will not swing upwardly into the path of an oncoming tube. However, when it is desired to change the tools 13 or roller 21, the latch 25 may be disengaged from the lug 28 and the carrier A swung on its pivotal support 10 into position where it is readily accessible.

A grooved flash guide member 29 is secured to the side of the frame 2 just ahead of the outlet slot or opening 19. As seen in Figure 1 the severed flash 30 is directed by this guide 29 in the direction of movement of the tube. Ample clearance for the flash 30 is provided as no interfering parts are attached to or carried by the frame 2 behind the side flash outlet opening 19.

In the above described embodiment of my invention the pivoted tool carrier, having a gauge roll supported thereby and having the cutting tool carried between the center of the gauge roll and the pivotal support of the carrier, makes possible the employment of a cutting tool contoured to cause it to tend to dig into the tube wall. Such tendency is controlled, however, by the gauge roll and is utilized to maintain the gauge roll at all times in firm contact with the tube surface thus following any variations in wall thickness of the tube, tube form or the like. By mounting the tool carrier A directly on the same axis or shaft as the bottom support roll 6 a firm support for the tool 13 is obtained. It will be understood that, if desired, an external tube supporting roll may be positioned to engage the tube directly opposite the point of engagement of the roll 6 therewith and thus the downward pressure upon the shaft 10 can be taken care of even though the frame member 2 may be relatively light as is necessarily the case in small diameter tubes or pipes.

In Figures 6, 7 and 8 a modification of my invention is illustrated in which a frame 31 carries support rolls 32, 33 and 34 and a guide roll 35 which prevents lateral movement of the frame 31. The tube support roll 32 is grooved at 36 to accommodate the flash or burr 37 on the inside of the tube 38. The tool carrier B is pivotally mounted in a suitable elongated slot 39 in the frame 31 on a shaft 40. This shaft 40 is the shaft upon which the support roll 34 is mounted. As is clearly seen in Figures 7 and 8, the carrier B is provided with a flash slot 41, the side walls of which have lugs 42 which fit grooves 43 in the tool 44. A gauge roll 45 is mounted on a shaft 46 in the slot 47 at the forward end of the carrier B and adjustment of the position of the cutting edge 48 of the tool 44 relative to the gauge roll 45 is effected by the adjusting screw 49.

A body of rubber or other similar resilient material 50 is mounted in a cupped aperture 51 in a projecting portion of the carrier B on the opposite side of the pivot shaft 40 from the tool 48. An overlying cap portion 52 of the frame 31 is provided with a hole through which the screw 53 has free sliding movement. The screw 53 has threaded engagement at 54 with the tool carrier B and serves to clamp and impose a compressive force upon the resilient member 50. As is seen in Figure 7 the head of the screw 53 clears the bottom of the counter-sunk portion of the aperture in the cover plate 52 and the resilient member 50 is exerting a force tending to push downwardly on the projecting portion of the tool carrier B. This tends to swing the carrier B about its pivot 40 in clockwise direction and to cause the cutting edge 48 of the tool 44 to cut or trim the burr. However, in this embodiment of my invention, as in that previously described, as soon as the cutting action starts, the contour of the cutting tool is such that the tool tends to dig into the flash or burr and to swing the carrier B about the pivot 40 lifting the left hand end of the carrier until the gauge roll 45 engages the inner wall of the tube. This, of course, limits the digging in action of the tool and, by adjusting the position of the tool cutting edge 48 relative to the gauge roll 45, the depth of cut may be accurately adjusted. The flash 55 after being severed by the tool 44 passes vertically downwardly through the slot 41 and has a free passage below the frame 31 and the lateral guide roll 35 and then may move along with the tube. A hole 56 in the tool 44 permits a screw driver to engage the adjusting screw 49 to adjust the vertical position of the cutting edge 48 of the tool. In this embodiment of my invention the advantages of the pivotally supported tool carrier having a gauge roll, or other suitable gauging member such as a slide or the like, and a tool carried between the gauge and the pivotel support for the carrier are obtained.

In the device shown in Figures 9, 10 and 11, the flash cutter frame 57 is supported on three rolls in the usual manner, only two of which, the rear bottom roll 58 and the central upper roll 59, are shown. A slot 60 in the overhanging extension 61 of the frame 57 accommodates the tool carrier C. This carrier is pivotally supported on its shaft 62 which shaft has a cut away central section 63. The tool 64 has sliding movement in grooves 65 in the side walls of the carrier C and an adjusting screw 66, provided with a lock nut 67, has threaded engagement with the end 68 of the carrier C, a tubular extension 69 being provided to facilitate adjustment and locking of the screw 66. A flash guard member 70 is secured to the tool 64 and slips over the reduced portion 63 of the shaft 62 to prevent entangling of the flash in the shaft or tool adjusting mechanisms. The gauge roll 71 is mounted at the end of the carrier C on a shaft 72 and a spring 73, supported on a transverse member 74 of the frame 57, tends to lift the roll 71 and tool 64 into cutting position. The cutting edge 75 of the tool is preferably contoured to exert a force tending to swing the carrier C around the pivot shaft 63 in the manner explained in connection with the previously described forms of my invention. A roll 71 acts as a stop or gauge to limit the depth of cut taken by the tool 75 and the severed flash 76 passes out through a slot 77 in the carrier C and may move freely along with the tube 78 without danger of marring the inner wall of the tube.

Although I have described the illustrated embodiments of my invention in considerable detail it will be understood by those skilled in the art that variations and modifications may be made in the specific form of the apparatus employed to carry out my invention without departing from the spirit thereof. I do not, therefore, wish to be limited to the exact devices herein shown and described, but claim as my invention all embodiments thereof coming within the scope of the appended claims.

I claim:

1. In an inside flash cutter of the type described, the combination of a frame, means for supporting said frame within a tubular article having a flash to be cut, a tool carrier pivotally supported by said frame, a cutting tool on said carrier on one side of the pivotal support therefor, and a gauge member on said carrier on the same side of the pivotal support but further removed therefrom than said tool, said tool having a cutting edge formed to tend to dig into the wall of the tubular article and said gauge member being adapted to engage the wall of said tubular article to limit the depth of cut of said tool.

2. In an inside flash cutter of the type described, the combination of a frame, means for supporting said frame within a tubular article having a flash to be cut, a tool carrier pivotally supported by said frame, a cutting tool on said carrier on one side of the pivotal support therefor, a gauge member on said carrier on the same side of the pivotal support but further removed therefrom than said tool, said tool having a cutting edge formed to tend to dig into the wall of the tubular article and said gauge member being adapted to engage the wall of said tubular article to limit the depth of cut of said tool, and resilient means between said frame and tool carrier positioned to exert a force tending to move said carrier about its pivotal support to cause the cutting edge of said tool to engage the tubular article.

3. In an inside flash cutter of the type described, the combination of a frame, means for supporting said frame within a tubular article having a flash to be cut, a tool carrier pivotally supported by said frame, a cutting tool on said carrier on one side of the pivotal support therefor, a gauge member on said carrier on the same side of the pivotal support but further removed therefrom than said tool, said tool having a cutting edge formed to tend to dig into the wall of the tubular article and said gauge member being adapted to engage the wall of said tubular article to limit the depth of cut of said tool, and resilient means between said frame and tool carrier positioned to exert a force tending to move said carrier about its pivotal support to cause the cutting edge of said tool to engage the tubular article, said frame having a flash conducting passage extending therethrough and disposed between the cutting edge of said tool and said gauge member.

4. In a flash removing device of the type described, a frame, a shaft supported by said frame, a supporting roll carried on said shaft, said supporting roll being adapted to engage the inner surface of a tubular article, a tool carrier pivotally mounted on said shaft, a tool on said carrier spaced from said shaft, a gauge roll adapted to engage the surface of the article from which a flash is being removed and mounted on said carrier and spaced from said shaft in the same direction but further than said tool, means for exerting a force on said carrier tending to move said tool into cutting engagement with the inner surface of a tubular article, and means for adjusting the position of said tool on said carrier relative to the position of said gauge roll on said carrier.

5. In a flash removing device of the type described, a frame, a shaft supported by said frame, a supporting roll carried on said shaft, said supporting roll being adapted to engage the inner surface of a tubular article, a tool carrier pivotally mounted on said shaft, a tool on said carrier spaced from said shaft, and a gauge roll adapted to engage the surface of the article from which a flash is being removed and mounted on said carrier and spaced from said shaft in the same direction but further than said tool, said frame having a flash guiding aperture opening at one end between said tool and gauge roll and at its other end on one side of said frame member.

6. In a device of the type described, a frame, a tool carrier pivotally mounted on said frame, a gauge roll rotatably supported adjacent one end of said carrier, a tool mounted on said carrier between said gauge roll and the pivotal support for said carrier, said carrier having a portion extending away from its pivotal support on the opposite side thereof from said tool and gauge roll, and resilient means disposed between said frame and said portion of said support and adapted to exert a force tending to swing said carrier about its pivotal support in a direction to move said tool and gauge roll away from said frame.

7. In a device of the type described, a frame, a tool carrier pivotally mounted on said frame, a gauge roll rotatably supported adjacent one end of said carrier, a tool mounted on said carrier between said gauge roll and the pivotal support for said carrier, said carrier having a portion extending away from its pivotal support on the opposite side thereof from said tool and gauge roll, resilient means disposed between said frame and said portion of said support and adapted to exert a force tending to swing said carrier about its pivotal support in a direction to move said tool and gauge roll away from said frame, and means for limiting said movement of said carrier.

8. In a device of the type described, a frame, a tool carrier pivotally mounted on said frame, a gauge roll rotatably supported adjacent one end of said carrier, a tool mounted on said carrier between said gauge roll and the pivotal support for said carrier, said carrier having a portion extending away from its pivotal support on the opposite side thereof from said tool and gauge roll, resilient means disposed between said frame and said portion of said carrier and adapted to exert a force tending to swing said carrier about its pivotal support in a direction to move said tool and gauge roll away from said frame, means for limiting said movement of said carrier, and means for adjusting the position of said tool on said carrier relative to said gauge roll.

9. In a device of the type described, a frame, rollers carried by said frame and adapted to support said frame in spaced relation to the inner wall of a tubular article, said frame having a portion projecting beyond the roller carrying portion of the frame, said projecting portion having an elongated slot extending therethrough, a shaft extending across said slot, a tool carrier in said slot and pivotally mounted on said shaft, a gauge member adjacent one end of said carrier and adapted to engage the inner surface of a tubular article, a flash cutting tool on said carrier between said gauge member and said shaft, and resilient means between said frame and carrier tending to move said carrier on its pivotal support to urge said tool into engagement with the tubular article.

10. In apparatus of the type described, the combination of a frame, means for supporting said frame within a tubular article having a flash or burr to be cut, a tool carrier pivotally supported by said frame, a cutting tool on said carrier on one side of the pivotal support therefor, a gauge member on said carrier on the same side of the pivotal support but further removed therefrom than said tool, said tool having a cutting edge formed to tend to dig into the wall of the tubular article, said gauge member being adapted to engage the wall of said tubular article to limit the depth of cut of said tool, and means for causing relative movement between a tubular article and said flash cutter whereby said cutting tool will dig into and sever the flash and maintain said gauge member in contact with the inner surface of the tubular article.

11. In a device of the type described, a frame, means carried by said frame and adapted to support said frame in spaced relation to the inner wall of a tubular article, said frame having a slot extending therethrough, a shaft extending across said slot, a tool carrier in said slot and pivotally mounted on said shaft, a gauge member on said carrier and adapted to engage the inner surface of the tubular article, a flash cutting tool on said carrier between said gauge member and said shaft, and resilient means between said frame and carrier tending to move said carrier on its pivotal support to urge said tool into engagement with the tubular article.

FREDERIC M. DARNER.